US010678426B2

(12) United States Patent
Clyne et al.

(10) Patent No.: US 10,678,426 B2
(45) Date of Patent: Jun. 9, 2020

(54) USER INTERFACE APPARATUS AND METHOD TO INPUT SCALE DATA

(71) Applicant: Cappfinity Limited, Birmingham (GB)

(72) Inventors: James Clyne, Southam (GB); Peter Alexander Linley, Coventry (GB)

(73) Assignee: Cappfinity Limited, Birmingham (GB)

( * ) Notice: Subject to any disclaimer, the term of this patent is extended or adjusted under 35 U.S.C. 154(b) by 252 days.

(21) Appl. No.: 14/971,128

(22) Filed: Dec. 16, 2015

(65) Prior Publication Data
US 2016/0266727 A1    Sep. 15, 2016

(30) Foreign Application Priority Data
Mar. 10, 2015  (GB) .................................. 1504049.6

(51) Int. Cl.
*G06F 3/0488* (2013.01)
*G06F 3/0484* (2013.01)
(52) U.S. Cl.
CPC ...... *G06F 3/04883* (2013.01); *G06F 3/04847* (2013.01)
(58) Field of Classification Search
CPC .......................... G06F 3/04883; G06F 3/04847
USPC .................................................. 715/700–866
See application file for complete search history.

(56) References Cited

U.S. PATENT DOCUMENTS

| 6,191,785 | B1 * | 2/2001 | Bertram | G06F 3/04847 345/157 |
| 6,501,489 | B1 * | 12/2002 | Kobayashi | G06F 3/0481 715/764 |
| 6,542,171 | B1 * | 4/2003 | Satou | A63B 24/0003 463/30 |
| 7,366,307 | B2 * | 4/2008 | Yanz | H04R 25/70 381/60 |
| 8,799,078 | B1 * | 8/2014 | Kniaz | G06Q 30/0242 705/14.4 |
| 2006/0103651 | A1 * | 5/2006 | Kessler | G06F 3/04847 345/440.1 |
| 2008/0049039 | A1 * | 2/2008 | Berrill | G06F 3/04847 345/581 |
| 2008/0062193 | A1 * | 3/2008 | Olson | H04N 1/46 345/591 |
| 2008/0091635 | A1 * | 4/2008 | James | G06F 3/04847 345/473 |

(Continued)

*Primary Examiner* — Daniel Samwel
(74) *Attorney, Agent, or Firm* — Schwegman Lundberg & Woessner, P.A.

(57) ABSTRACT

A method and a user interface for inputting scale data detects an initial user interaction from a user input device; controls a display device to display an image of a path for user interaction to follow to input a scale selection response from a scale between a first scale end indicative of a positive response and a second scale end indicative of a negative response; controls the display device in response to the initial user interaction to display an indication on a start point of the path intermediate a first end of the path representing the first scale end and a second end of the path representing the second scale end, the path being asymmetric about the start point; detects a user traversal interaction from the user input device along the path in a positive or negative response direction to terminate at a selection point on the path; and determines a scale selection response and input scale data based on the selection point on the path.

31 Claims, 10 Drawing Sheets

(56) References Cited

U.S. PATENT DOCUMENTS

| | | | |
|---|---|---|---|
| 2008/0189657 A1* | 8/2008 | Kim | G06F 3/0485 |
| | | | 715/810 |
| 2009/0249254 A1* | 10/2009 | Walker | G06F 17/30867 |
| | | | 715/834 |
| 2010/0005420 A1* | 1/2010 | Schneider | G06F 3/04812 |
| | | | 715/833 |
| 2011/0157046 A1* | 6/2011 | Lee | G04G 21/08 |
| | | | 345/173 |
| 2011/0201386 A1* | 8/2011 | Yariv | G06F 3/04847 |
| | | | 455/566 |
| 2012/0280922 A1* | 11/2012 | Lee | G06F 3/04847 |
| | | | 345/173 |
| 2014/0157199 A1* | 6/2014 | Kahler | G06Q 30/0267 |
| | | | 715/833 |
| 2014/0223376 A1* | 8/2014 | Tarvainen | H04N 5/23216 |
| | | | 715/833 |
| 2016/0085398 A1* | 3/2016 | Cifteli | G06F 3/0488 |
| | | | 715/740 |
| 2016/0378316 A1* | 12/2016 | Jakubiec | G06F 3/04847 |
| | | | 715/771 |

* cited by examiner

US 10,678,426 B2

USER INTERFACE APPARATUS AND METHOD TO INPUT SCALE DATA

CLAIM OF PRIORITY

This application claims the benefit of priority under 35 U.S.C. § 119 to United Kingdom Patent Application No. 1504049.6, filed on Mar. 10, 2015, which is hereby incorporated by reference herein in its entirety.

FIELD OF THE INVENTION

The present invention relates to a user interface apparatus and method.

BACKGROUND INFORMATION

The way in which humans interact with digital electronic devices is a major factor in the efficiency of the technical functioning of the device. The effectiveness of digital electronic devices can be drastically reduced if they are not easy to use. Designers and manufacturers therefore expend a great deal of effort in designing intuitive user interfaces that can display information to users and enable them to interact by making selections and entering data easily. One such form of user input is the input of a selection from a scalar range of options e.g. a selection from 1 to 10. This type of input is often used to obtain user input such as an opinion or emotive response to questions or topics, such as "How would you rate our service, from 1 being very poor to 10 being excellent?" Typically, such scalar data responses are input on a user interface using a linear scale or slider. Such an interface input design does not however, best engage with users to elicit a natural response.

SUMMARY

One aspect of the disclosed subject matter provides a user interface apparatus comprising a display device; a touch sensitive user input device; and a processor programmed to: detect an initial user interaction from the user input device, control the display device to display an image of a path for user interaction to follow to input a scale selection response from a scale between a first scale end indicative of a positive response and a second scale end indicative of a negative response, control the display device in response to the initial user interaction to display an indication on a start point of the path intermediate a first end of the path representing the first scale end and a second end of the path representing the second scale end, the path being asymmetric about the start point, detect a user traversal interaction from the user input device along the path in a positive or negative response direction to terminate at a selection point on the path, and determine a scale selection response and input scale data based on the selection point on the path.

Another aspect provides a method of operating a user interface for inputting scale data, the method comprising: detecting an initial user interaction from a user input device, controlling a display device to display an image of a path for user interaction to follow to input a scale selection response from a scale between a first scale end indicative of a positive response and a second scale end indicative of a negative response; controlling the display device in response to the initial user interaction to display an indication on a start point of the path intermediate a first end of the path representing the first scale end and a second end of the path representing the second scale end, the path being asymmetric about the start point; detecting a user traversal interaction from the user input device along the path in a positive or negative response direction to terminate at a selection point on the path; and determining a scale selection response and input scale data based on the selection point on the path.

Another aspect provides a system for providing a user interface to a client device having a display device and a user input device, the system comprising: a processor; and a network interface adapted to be controller by the processor to transmit computer program code to the client device to cause the client device to be configured as the user interface apparatus.

Another aspect provides a method of providing a user interface to a client device having a display device and a user input device, the method comprising transmit computer program code to the client device to cause the client device to be configured as the user interface apparatus.

DETAILED DESCRIPTION

Figure 1:
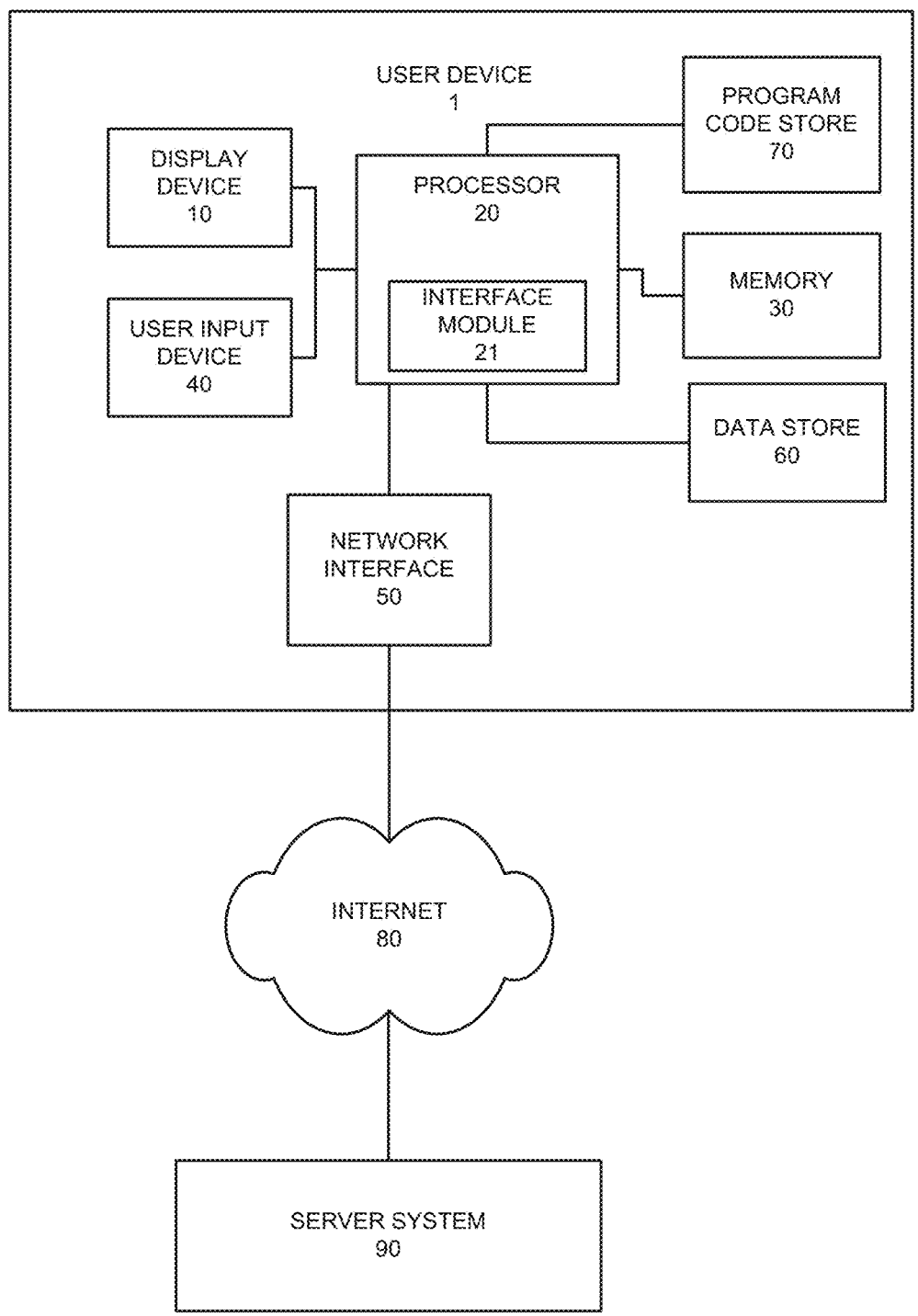
FIG. 1 is a schematic diagram illustrating an apparatus incorporating a user interface apparatus and system according to one embodiment.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

In the following embodiments, like components are labelled with like reference numerals.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules with related control and data signals communicated between and through the modules, or as portions of an application-specific integrated circuit. Thus, the exemplary process flow is applicable to software, firmware, and hardware implementations.

A generalized embodiment is directed to a user interface apparatus and method which can be used in a digital electronic apparatus to enable users to easily use an input device to enter user selections for scalar input data in response to questions for example. A display unit is controlled to display an image of a path for navigation along by a user to input scale data starting at a highlighted start point intermediate path ends indicative of opposed positive and negative responses. The path is asymmetric about the start point to provide different paths to navigate to input a positive response value compared with a negative response value. The positive path requires a user input movement, which is more natural and positive than the negative path. The user input movement requires a user traversal input along the path from the start point to a selection point at which the selected scale value is determined for the input of a scale data value.

Embodiments can be applied to any form of user input device, such as a pointer device (mouse, trackpad, trackerball, pen device), gesture input device, motion and/or orientation sensors, or a haptic input device (a touch sensitive input device), such as a touch pad and touchscreen that can be operated by use of a user's digit or by a stylus or pen. Hence, the input device and the display can be separate or combined. A touch sensitive input device operates particularly well since the differential path shapes provided for positive and negative responses require a user to move their digit or hand over the touch sensitive device in the pattern of the required paths. The movement in such patterns reinforces or confirms the user's feeling or intent towards the input they are making. One embodiment is particularly suited to a user mobile device, such as a mobile telephone, in which users tend to operate a touch screen of the device using their thumbs.

In one embodiment, a response along the positive path direction can require the user to traverse an ascending path in a natural direction. For a right-handed person this might be upwards and to the right, whereas for a left-handed person this would be upwards to the left. In addition, a response along the negative path direction can require the user to traverse a descending path in an unnatural or less natural direction. For a right-handed person this might be downwards and to the left, whereas for a left-handed person this would be downwards to the right. The path traversed in the negative response direction can, in one embodiment, include a discontinuity, requiring a user input traversal to change direction to follow the path to act as a confirmation of the negativity towards the input by the user. Such a path shape can comprise a tick (check mark) or letter J for example.

In one embodiment, the image of the path includes gradations indicating the values along the scale and the spacing of the gradations increases away from the start point towards the positive and negative response ends. This increase in spacing is provided to require a user to make more effort in moving to extremes of the scale to input extreme positive or negative inputs. This can assist in mimicking the natural inclination of users and require them to make a more extreme movement along the path to input a more extreme response.

In an embodiment, the image of the path can either be displayed before an initial user selection or only after. If the image of the path is displayed before the initial user selection, it can be displayed in a suppressed form (e.g., greyed out, ghosted, or of a different colour) and when the initial user selection is received, the image of the path can be switch to be displayed in an enhanced or normal form.

In one embodiment, a server system can be connected to the user interface apparatus over a network such as the internet to provide code for implementation by the user interface apparatus to provide the interface. The code can be provided in the form of a web page with appropriate plug-in code, such as Java™ for example.

The user interface device in the embodiments can comprise any digital electronic apparatus used by a user, such as a personal computer, laptop, desktop, tablet computer, personal digital assistant, MP4 player, smart phone, digital radio, printer, facsimile machine, or any other digital electronic device.

Specific embodiments will now be described with reference to the figures.

FIG. 1 is a schematic diagram of a user interface apparatus incorporated into a user device 1 according to one embodiment. The user device 1 has a processor 20 for reading and implementing code stored in the program code store 70 connected to the processor 20. In this embodiment, the principle code module implemented to provide the user interface functionality is an interface module 21. The processor 20 is connected to a memory 30 for use as working memory. A data store 60 is connected to the processor 20 for storing data for use by the processor, such as data in the form of questions to be displayed to prompt a user to make a scale selection. In this embodiment, the user device includes a network interface 50 for connection to a network to enable the user device 1 to transmit and receive data. The network interface can comprise any suitable network interface such as an interface to the internet or to a local area network. The interface 50 can provide a wired or wireless connection e.g. Wi-Fi, Bluetooth or a connection to a cellular telecommunications network. In this embodiment, the network interface is illustrated as connected to the internet 80. A computer system 90 which can comprise a web server for example is connected to the internet 80 and can hence connect to the network interface 50 of the user device 1 in order to provide code for the generation of the user interface to enable the selection of a scale input by the user. The code can comprise web pages with an interactive component such as a Java™ applet.

A display device 10 is connected to the processor 20 for the display of an image of a scale path to a user for the selection by the user of a scale input, as will be described in more detail herein after. A user input device 40 is connected to the processor 20. The input device can be integrated into a display and in one embodiment can comprise a touch sensitive display. In an alternative embodiment the user input device can comprise a touch pad separate to the display. In further alternative embodiments, the user input device can comprise a pointing device such as a mouse, trackpad, trackerball, stylus or pen, motion and/or orientation sensors, or a user gesture detection device, such as a camera to analyze user gestures.

The operation of one embodiment of the apparatus will now be described with reference to FIGS. 2a to 2c. These figures illustrate a sequence of displayed images during a user interaction to input a scale input in response to a question.

Figure 2A:
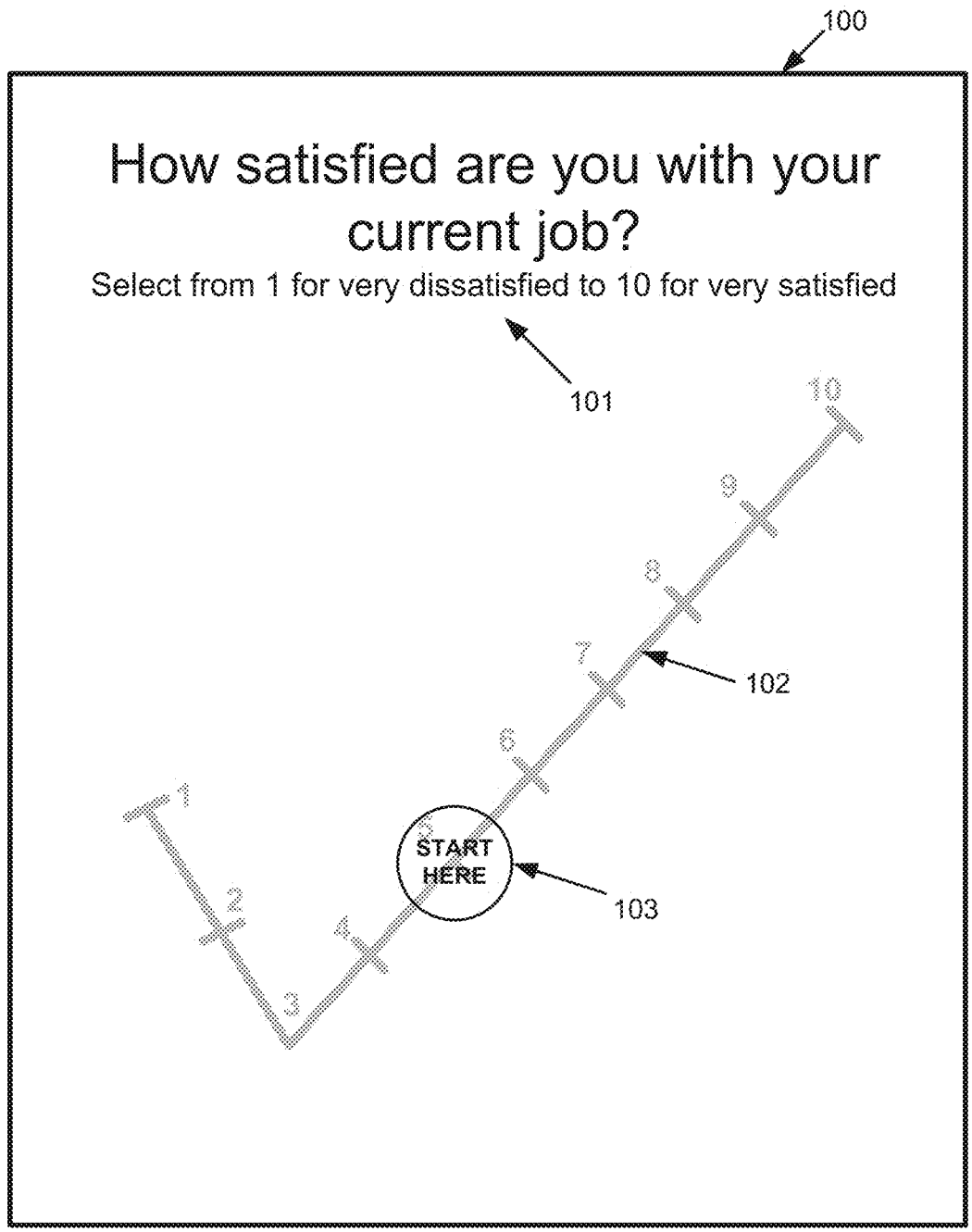
FIGS. 2a to 2c are diagrams illustrating a user interface according to one embodiment.

FIG. 2a illustrates schematically an initial display screen area 100 on the display device 10 in which a question 101 is displayed. In this example, the question is "How satisfied are you with your current job?" A user prompt is also displayed to explain to a user that they need to select a scale input from 1 for very dissatisfied (a very negative response) to 10 for very satisfied (a very positive response). Below the question 101 on the display screen area 100, an image of a path 102 in the form of a tick or check mark shape with gradations labelled 1 to 10 is displayed in suppressed or greyed out form. At an intermediate point on the image of the path, a start point is indicated by an icon "Start Here" 103. In this embodiment, the intermediate location is at a near mid-point of 5 on the scale of 1 to 10. However, in alternative embodiments, the start point can be located at any mid-point between ends of the path. The positive gradations of the path 102 are from 6 to 10, with 10 being at the end of the path indicative of the most positive response, and this portion of the path 102 lies in an ascending location from the start point. The positive gradation portion of the path 102 extends generally linearly upwardly and to the right on the display relative to the start point as viewed by a user in relationship to the text. The negative gradation portion of the path 102 extends downwardly and to the left initially on the display relative to the start point as viewed by a user in relationship to the text and then the negative gradation portion of the path 102 deflects upwardly and to the left to form the tick or check mark shape. Hence, the negative portion of the path has a discontinuity.

Although in this embodiment, the greyed out image of the path 102 is shown on the display area 100, in an alternative embodiment, the path is not displayed.

Figure 2B:
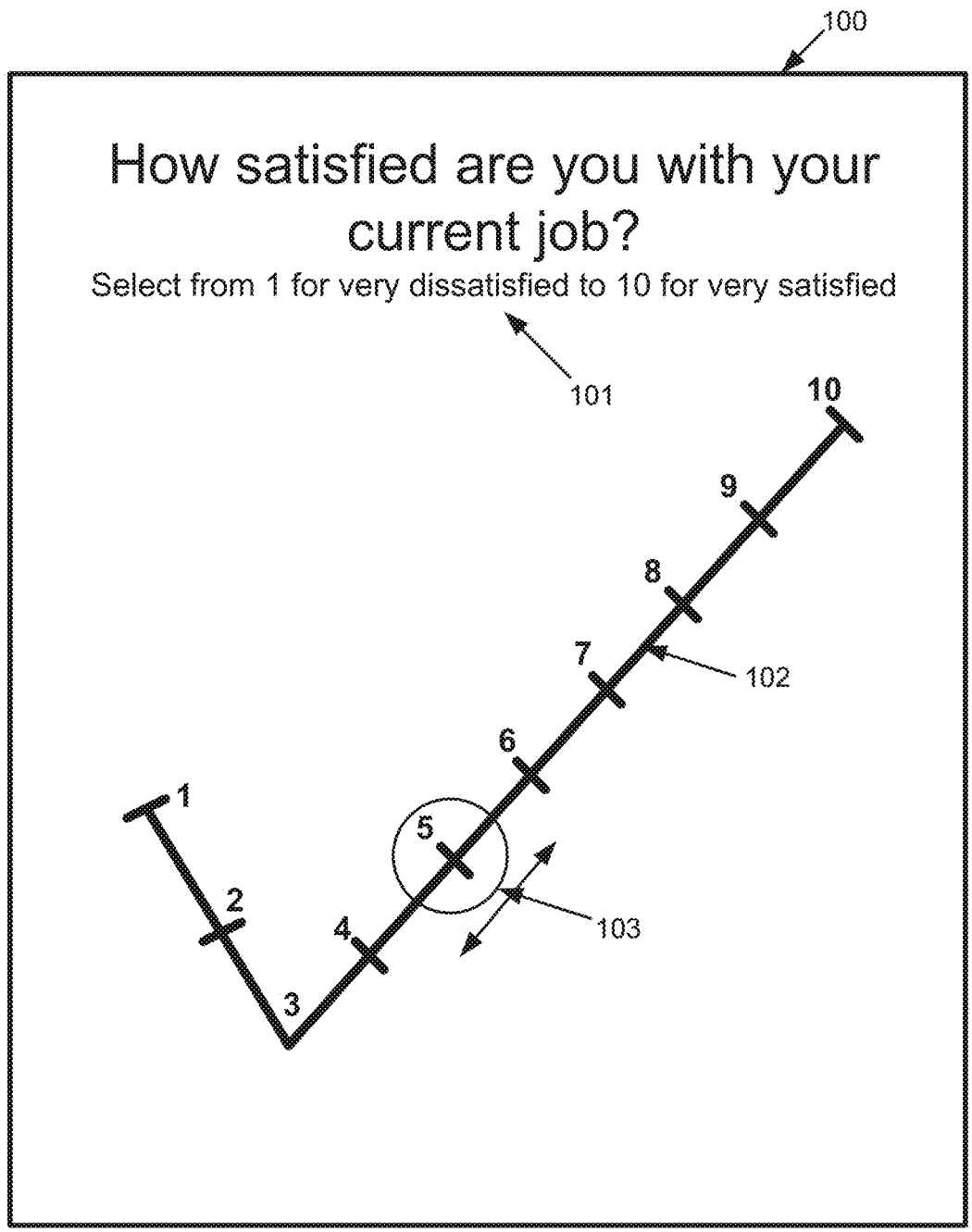

When a user selects the "Start Here" icon 103 using the user input device 40, the screen display changes to that illustrated in FIG. 2b.

As shown in FIG. 2a, the greyed out image of the path enhances and the user is able to traverse the icon 103 along the path to generate a traversal input as illustrated by the arrow. Using a pointer device such as a mouse, trackpad or gesture user input device, this is achieved by a drag operation of the icon 103 in a manner well known in the art. Using a touch sensitive input device, the traversal input is achieved by touching and dragging the icon 103 along the path 102.

Figure 2C:
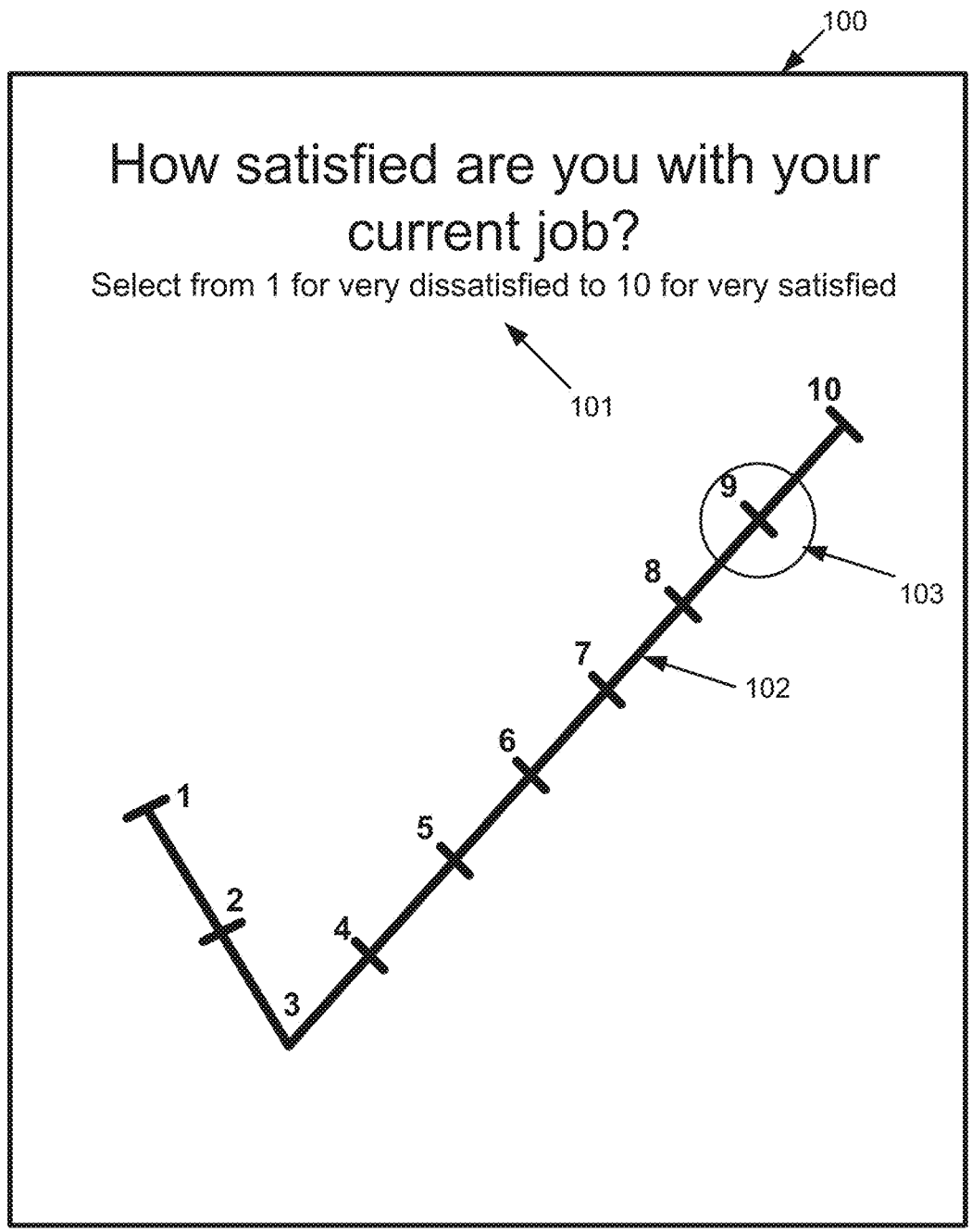

FIG. 2c illustrates the state of the display screen area 100 after a traversal selection by the user. In this embodiment, the user has dragged the icon 103 to stop at gradation value 9 along the path 102 in a positive selection response direction. The selection can be completed by the release of the pointed device, a particular motion or interaction of the user with an input device; or the removal of touch for a touch sensitive input device. The processor 20 detects the selection to generate the scale date input.

As can be seen with reference to FIGS. 2a to 2c, the use of a tick or check mark shape as the scale path for traversal for the selection of a scale input by the user provides the user with a more intuitive input interface. The ascending positive response selection path reinforces or assists the user to provide the positive response that the user feels for the question and similarly the descending and discontinuous negative response selection path reinforces or assists the user to provide the negative response that the user feels for the question. This is particularly the case when, in one embodiment, the user device 1, comprises a hand held device with a touch screen, such as a smart phone. The positive path ascending to the right is a natural and comfortable movement for the right thumb of a user, whereas the downward and angled negative path is less comfortable and natural.

Figure 3:
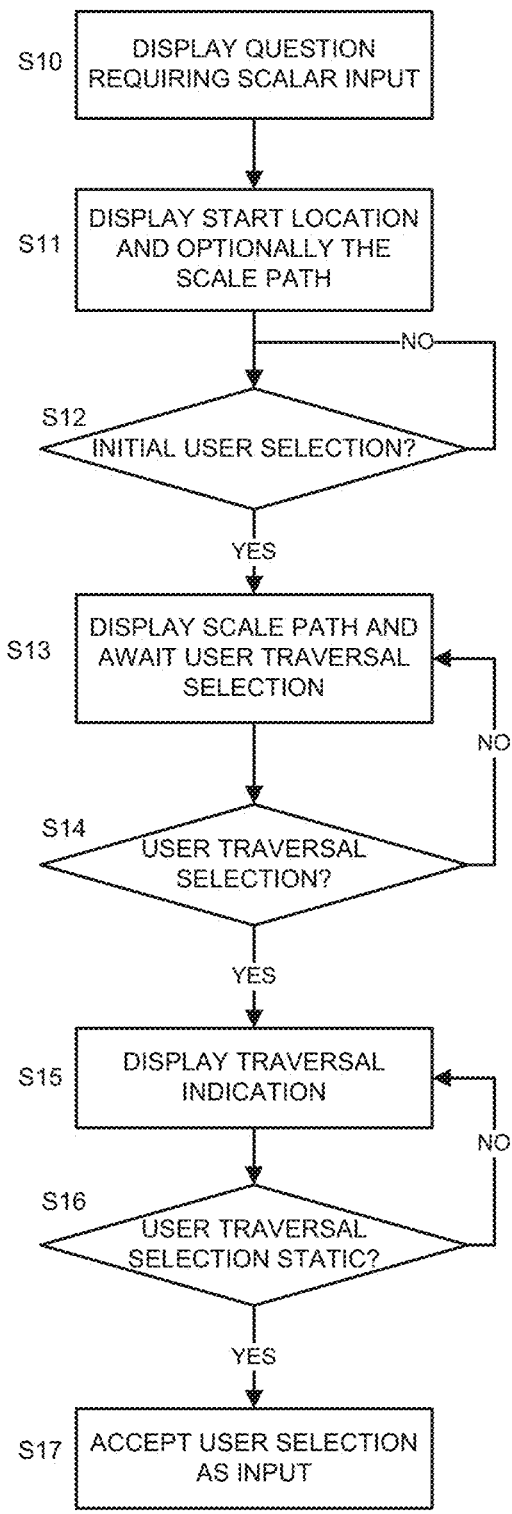
FIG. 3 is a flow diagram illustrating the process of operating the user interface according to one embodiment.

The operations performed by the processor 20 implementing the interface module 21 of one embodiment will now be described with reference to the flow diagram of FIG. 3.

In step S10 the processor 20 controls the display device 10 to display a question 101 requiring a scalar input from the user and in step S11 the processor 20 controls the display device 10 to display the start location as the start icon 103 and in the embodiment of FIGS. 2a to 2c, the image of the path greyed out. An initial user selection is then awaited in step S12 and when received, the display of FIG. 2b is generated to display the scale path 102 and to await a user traversal selection (step S13). When a user traversal selection is received (step S14), a traversal indication is displayed (step S15). Hence, the icon 103 is displayed being dragged along the path 102. When the user traversal is detected as being static e.g. the drag operation is complete (step S16) the user selection indicated by the icon 103 is accepted as the selection input and the scale input is hence determined (step S17).

Figure 4:
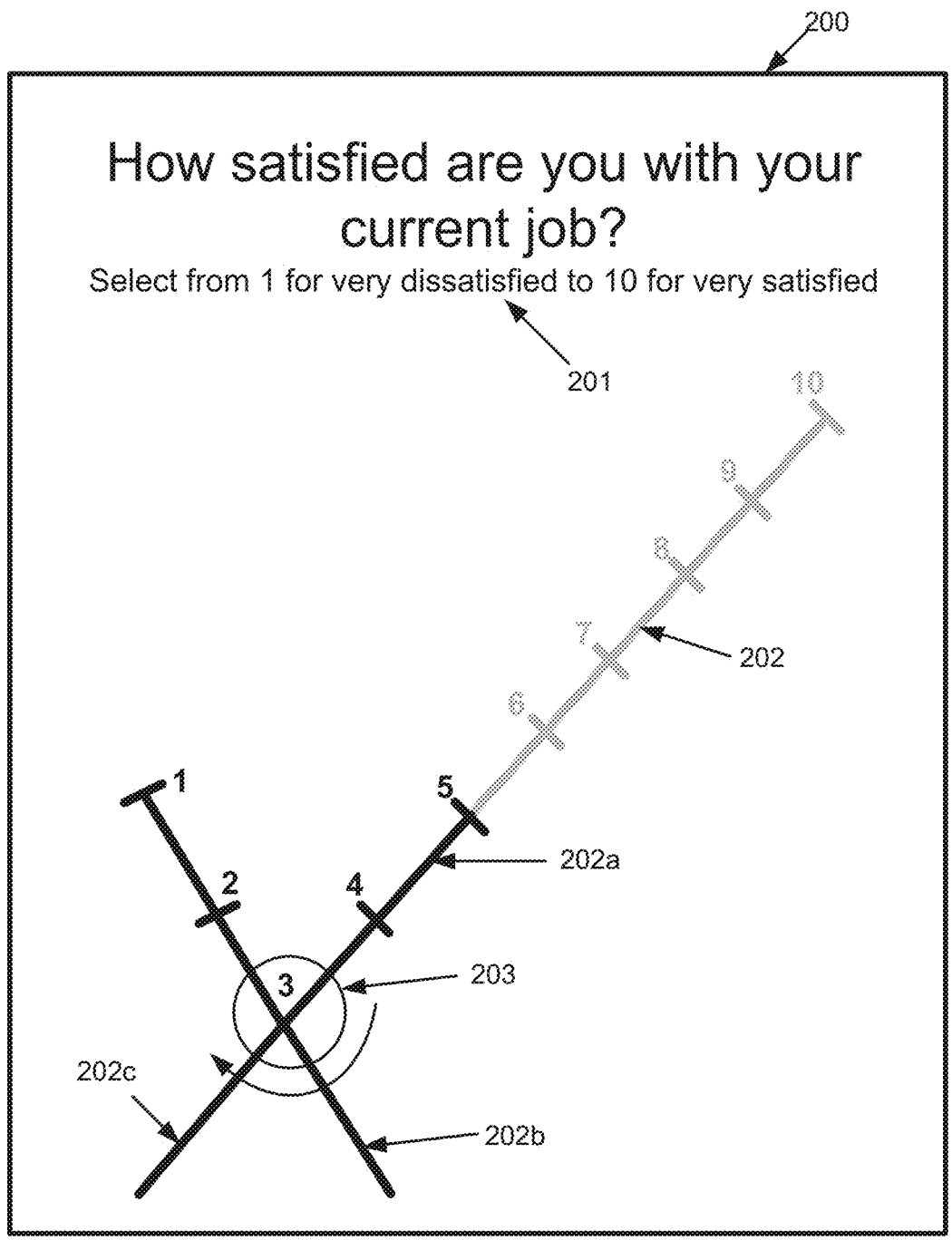
FIG. 4 is a diagram illustrating a user interface according to one embodiment.

FIG. 4 illustrates an embodiment, which is a modification of the embodiment of FIGS. 2a to 2c.

In this embodiment, when a user selection is a traversal in the negative portion of the path 202 in response to a question 201 displayed on the display screen area 200, the image of the path 202 is modified to reinforce the negative nature of the intended selection by the user. In this embodiment, the image of the path generally changes its appearance to a cross instead of a tick or check mark by the additional display of legs 202b and 202c and the original path 202 is reduced to a V shape 202a, such that the parts 202a, 202b and 202c form a cross. The path 202a is still the path that is traversable for the selection of the scale input.

Figure 5A:
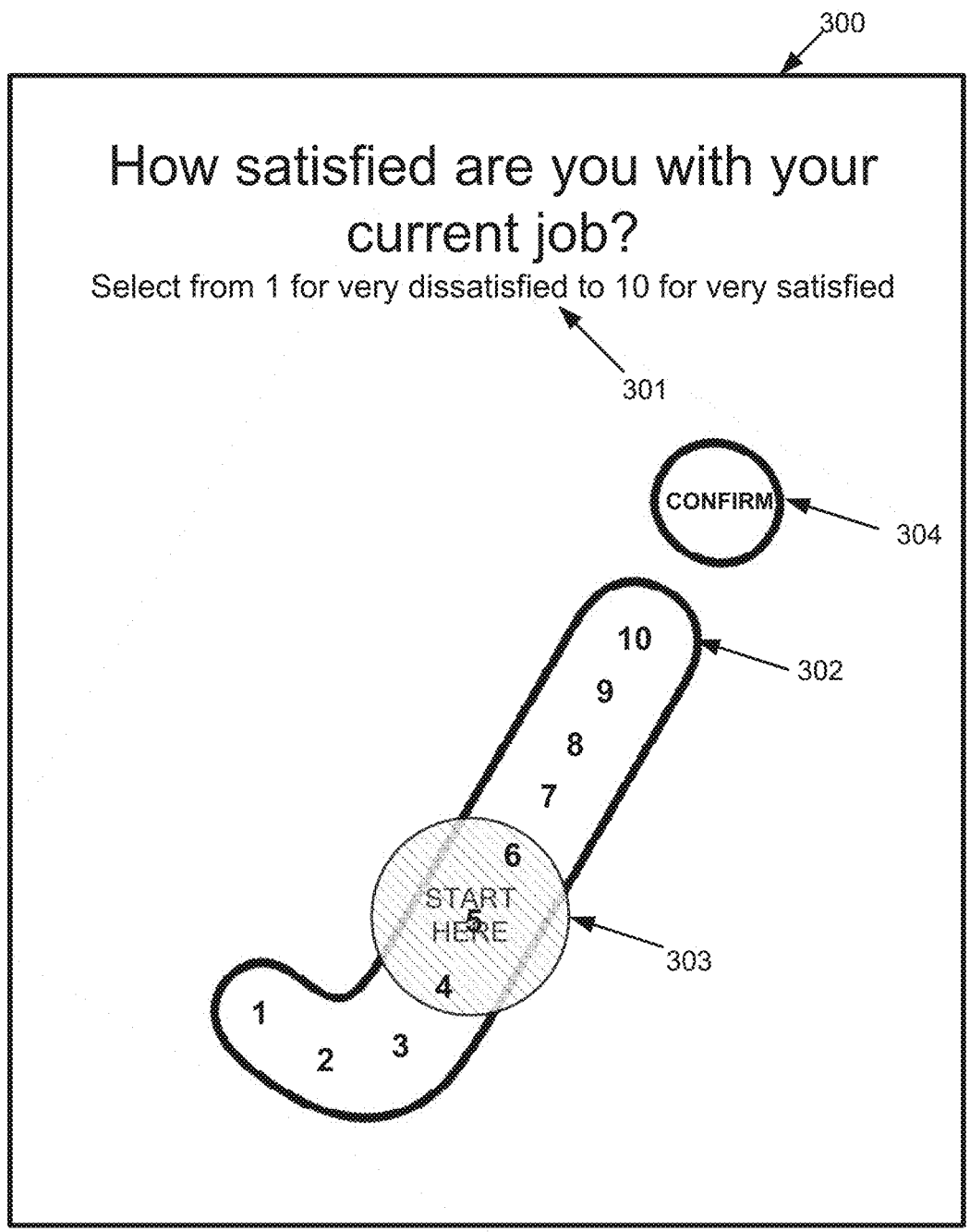
FIGS. 5a and 5b are diagrams illustrating a user interface according to one embodiment.
Figure 5B:
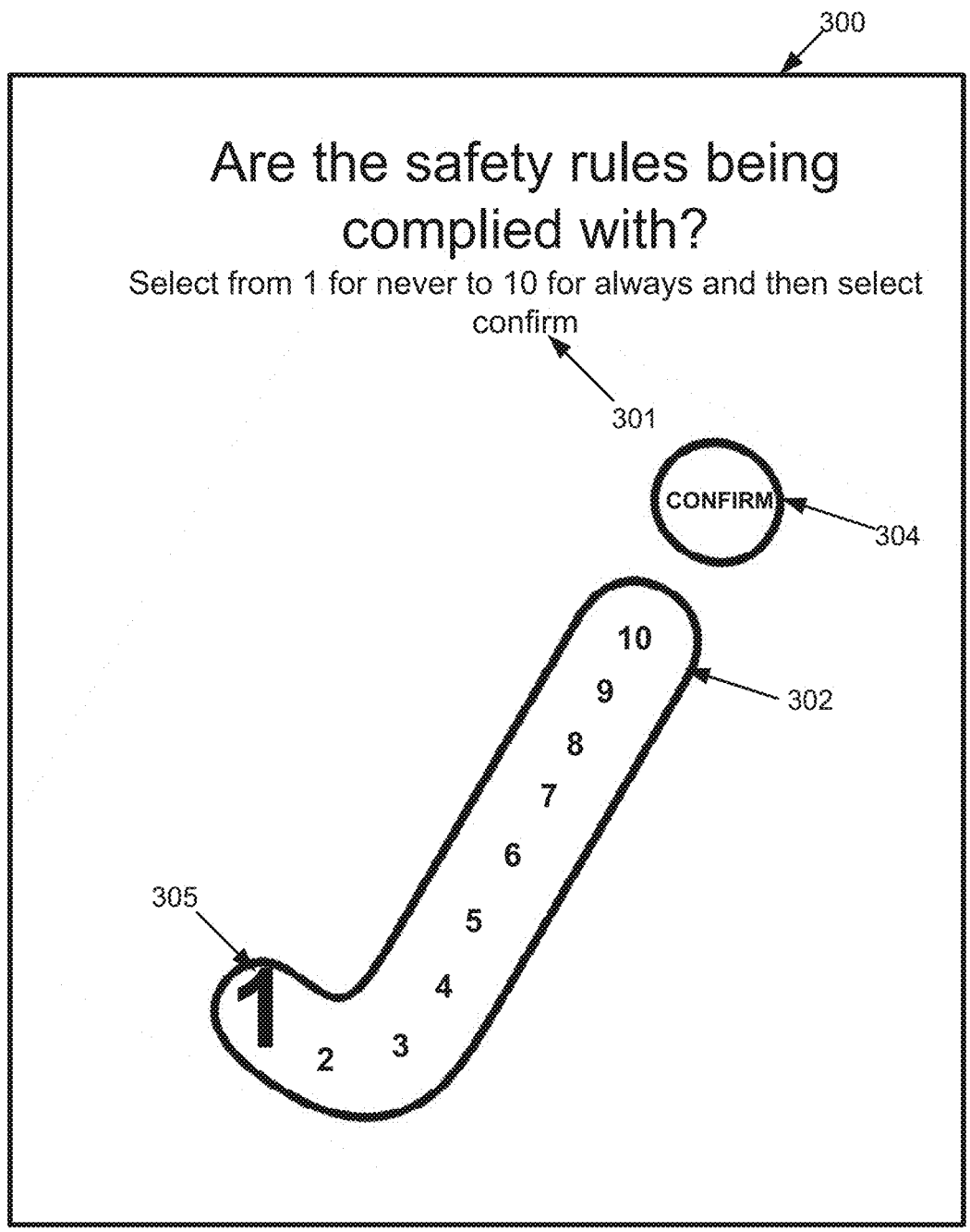

FIGS. 5a and 5b illustrate an alternative embodiment in which the shape of the image of the path 302 is a lower case letter j.

As seen in FIG. 5a, the display screen area 300 displays a question 301 and the image of the path 302 with the dot of the letter j comprising a confirm selection option 304. An icon 303 is displayed at a start point on the path with the message "Start Here" to enable a user to select to input a user traversal selection.

FIG. 5b illustrates the display screen area 300 after a traversal input by a user to select a negative response scale value of 1. An indicator of this selection is given by the enlarging of the gradation scale number 305. As the user traverses the path 302, the gradation scale numbers being passed by the traversal will enlarge and reduce until the selection 305 is reached. In this embodiment, in order to avoid false or erroneous input, in order for the indicated selection 305 to be accepted as a scale input, the user is required to select the confirm selection option 304.

In this embodiment, the path is formed of a shape comprising a letter with the two components of the letter acting as components in the user interface.

Figure 6A:
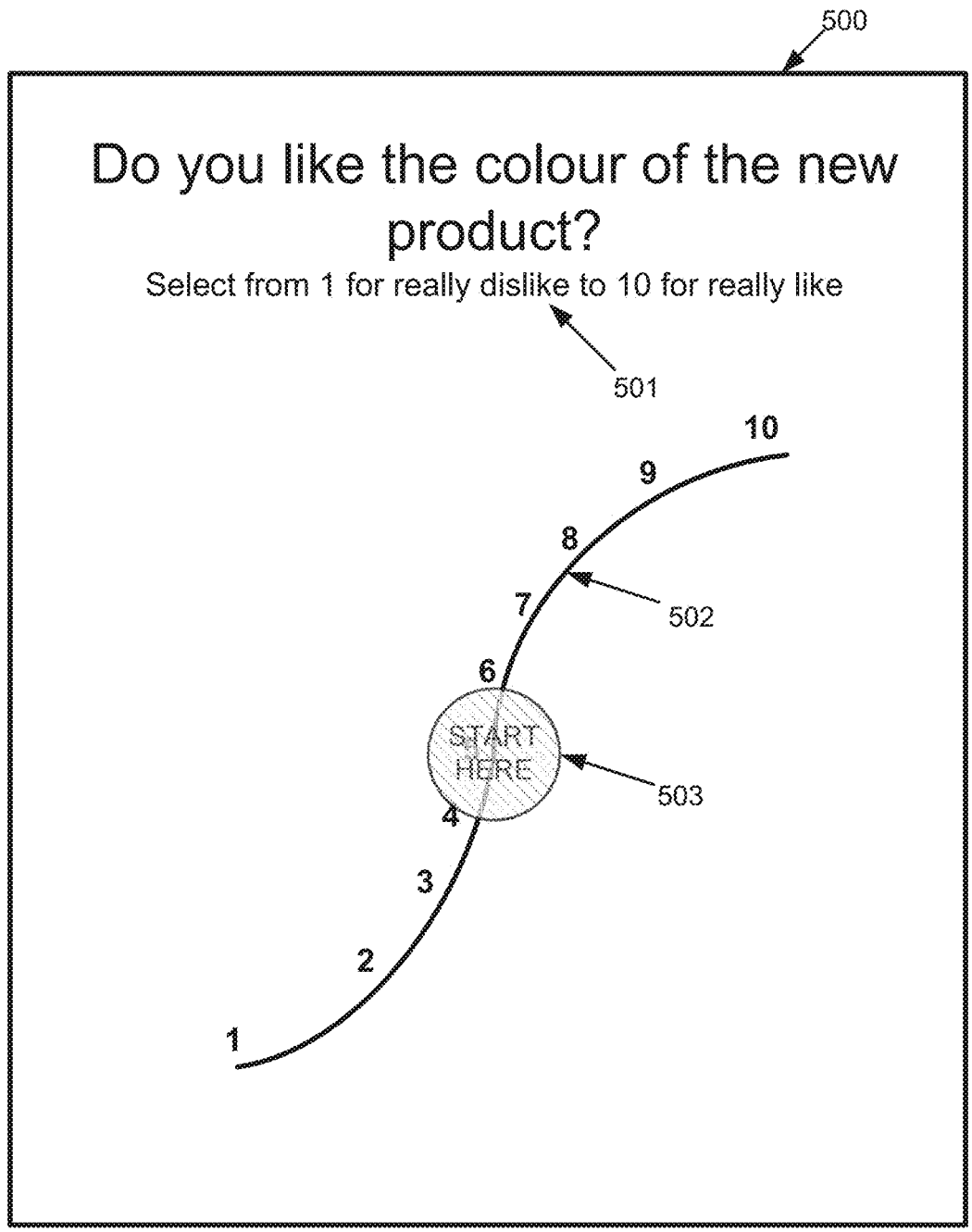
FIGS. 6a and 6b are diagrams illustrating a user interface according to one embodiment.
Figure 6B:
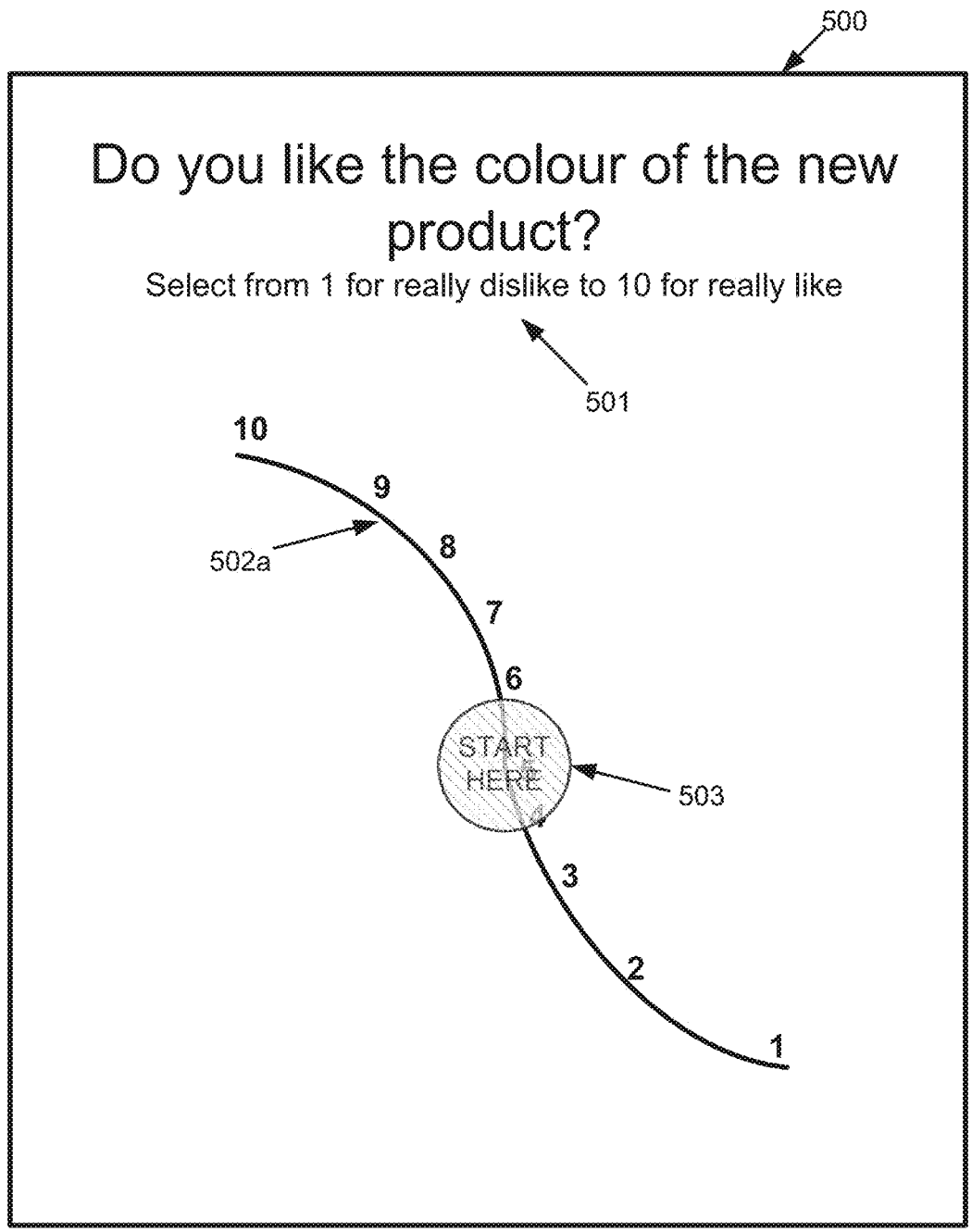

FIGS. 6a and 6b illustrate an alternative embodiment in which a displayed path shape can be selectively flipped about an axis dependent upon the required handedness of the user interface.

FIG. 6a illustrates a display screen area 500 in which a question 501 requiring a user scale input response is displayed. An image of a path 502 is displayed which in this embodiment comprises a sigmoid shape, with an ascending rightward directed curved positive response portion and a descending leftward directed curved negative response portion. An icon 503 is displayed at a start location on the path and the user input interaction operates as described for the previous embodiments.

FIG. 6a is a user interface designed for operation by a right-handed user, since the positive portion is ascending and curving to the right. If the user is left handed, the user can select to switch the operation of the user interface as shown in FIG. 6b. As shown in FIG. 6b, the image of the path flips about a vertical axis so that the positive portion of the path is ascending to the left. This provides a more natural user interaction for a left-handed user to input a positive response.

The ability to flip the path can be applied to any embodiment, such as those shown in FIGS. 2a to 2c, FIG. 4 and FIGS. 5a and 5b.

Although in some of the embodiments described, an icon is displayed to indicate to the user where to interact with the display using the user input device (an example of a selection reinforcement image), in alternative embodiments, when a user interacts (e.g. touches) a region on the screen the image of the path is displayed and traversal of the path can occur without the display of an icon. When the user interaction stops, the final point of interaction by the user is indicated as the selection on the scale by the user. In one embodiment the path is displayed with the user interaction at an intermediate position along the path.

Although in the embodiments, a tick or check mark, an S shape, and a letter j are described as example path shapes, in other embodiments other suitable shapes can be used.

The embodiments described above hence provide a user interface that enables a simple and more natural input of a selection of a scale value.

The following is a description of some generalized embodiments. Any embodiment can be used in combination with any other embodiment.

One embodiment provides a user interface apparatus for inputting scale data, the apparatus comprising: a display device; a user input device; and a processor programmed to: detect an initial user interaction from the user input device, control the display device to display an image of a path for user interaction to follow to input a scale selection response from a scale between a first scale end indicative of a positive response and a second scale end indicative of a negative response, control the display device in response to the initial user interaction to display an indication on a start point of the path intermediate a first end of the path representing the first scale end and a second end of the path representing the second scale end, the path being asymmetric about the start point, detect a user traversal interaction from the user input device along the path in a positive or negative response direction to terminate at a selection point on the path, and determine a scale selection response and input scale data based on the selection point on the path.

In one embodiment, the path comprises a positive response path portion displayed in an ascending direction to the user and a negative response path displayed in a descending direction to the user.

In one embodiment, the negative response path includes a discontinuity.

In one embodiment, the processor is adapted to control the display device to display the scale on the path with gradations increasing from the start point to the scale ends.

In one embodiment, the path comprises a tick or check mark shape.

In one embodiment, the processor is adapted to control the display device to display a selection reinforcement image in dependence upon the degree of user traversal interaction in the positive or negative response direction along the path.

In one embodiment, the processor is adapted to control the display device to display the image of the path prior to the initial user interaction.

In one embodiment, the processor is adapted to control the display device to display the image of the path prior to the initial user interaction in a suppressed form and to enhance the display of the image of the path in response to the initial user interaction.

In one embodiment, the processor is adapted to control the display device to only display the image of the path in response to the initial user interaction.

In one embodiment, the processor is adapted to control the display device to display a question to prompt the user to interact with the user input device.

In one embodiment, the processor is adapted to control the display device to: display a confirmation selection option, detect a user confirmation selection of the confirmation selection option from the user input device, and confirm the input scale data.

In one embodiment, the processor is adapted to generate a feedback to the user based on the determined scale selection response.

In one embodiment, the processor is adapted to control the display device in response to the user traversal interaction terminating at the selection point to display an indication of the scale selection response.

In one embodiment, the user input device comprises a touch sensitive device.

In one embodiment, the processor is adapted to control the display device in response to a user handedness input on the user input device to switch the displayed image of the path between an image of a left handed path and an image of a right handed path for use by left handed users and right handed users respectively, the images of the left and right handed paths comprising mirror images.

One embodiment provides a method of operating a user interface for inputting scale data, the method comprising: detecting an initial user interaction from a user input device; controlling a display device to display an image of a path for user interaction to follow to input a scale selection response from a scale between a first scale end indicative of a positive response and a second scale end indicative of a negative response; controlling the display device in response to the initial user interaction to display an indication on a start point of the path intermediate a first end of the path representing the first scale end and a second end of the path representing the second scale end, the path being asymmetric about the start point; detecting a user traversal interaction from the user input device along the path in a positive or negative response direction to terminate at a selection point on the path; and determining a scale selection response and input scale data based on the selection point on the path.

In one embodiment, the path comprises a positive response path portion displayed in an ascending direction to the user and a negative response path displayed in a descending direction to the user.

In one embodiment, the negative response path includes a discontinuity.

In one embodiment, the scale is displayed on the path with gradations increasing from the start point to the scale ends.

In one embodiment, the path comprises a tick or check mark shape.

In one embodiment, the method includes displaying a selection reinforcement image in dependence upon the degree of user traversal interaction in the positive or negative response direction along the path.

In one embodiment, the image of the path is displayed prior to the initial user interaction.

In one embodiment, the image of the path is displayed prior to the initial user interaction in a suppressed form and the display of the image of the path is enhanced in response to the initial user interaction.

In one embodiment, the image of the path is only displayed in response to the initial user interaction.

In one embodiment, the method includes displaying a question to prompt the user to interact with the user input device.

In one embodiment, the method includes displaying a confirmation selection option, detecting a user confirmation selection of the confirmation selection option from the user input device, and confirming the input scale data.

In one embodiment, the method includes generating a feedback to the user based on the determined scale selection response.

In one embodiment, the feedback comprises displaying an indication of the scale selection response in response to the user traversal interaction terminating at the selection point.

In one embodiment, the user input device comprises a touch sensitive device.

In one embodiment, the method includes receiving a user handedness input to switch the displayed image of the path between an image of a left handed path and an image of a right handed path for use by left handed users and right handed users respectively, the images of the left and right handed paths comprising mirror images.

One embodiment provides a system for providing a user interface to a client device having a display device and a user input device, the system comprising: a processor; and a network interface adapted to be controlled by the processor to transmit computer program code to the client device to cause the client device to be configured as the user interface apparatus.

One embodiment provides a method of providing a user interface to a client device having a display device and a user input device, the method comprising: transmit computer program code to the client device to cause the client device to be configured as the user interface apparatus.

Another embodiment provides a carrier medium such as a non-transient storage medium storing program code for controlling a processor of digital electronic device to carry out the method. Embodiments can be implemented in programmable digital logic that implements computer code. The code can be supplied to the programmable logic, such as a processor or microprocessor, on a carrier medium. One such form of carrier medium is a non-transitory medium that carries or stores the code, such as a solid-state memory, magnetic media (hard disk drive), or optical media (compact disc (CD) or digital versatile disc (DVD)).

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A user interface apparatus to input scale data, the apparatus comprising:
    a display device;
    a user input device; and
    a hardware-based processor programmed to:
        control the display device to display an image of a path in a suppressed form for user interaction to follow to input a scale selection response from a scale between a first scale end indicative of a positive response and a second scale end indicative of a negative response, and to display an indication of a start point on the path intermediate a first end of the path representing the first scale end and a second end of the path representing the second scale end, the path being asymmetric about the start point with a linear positive path portion for selection of a positive response extending from the start point and a non-linear negative path portion for selection of a negative response extending from the start point,
        detect an initial user interaction comprising a selection of the start point from the user input device,
        enhance the display of the image of the path from the suppressed form to an enhanced form based on the detection of the initial user interaction,
        detect a user traversal interaction from the user input device along the enhanced form of the path in a positive response direction along the positive path portion or a negative response direction along the negative response path portion to terminate at a selection point on the path, and
        determine a scale selection response and input scale data based on the selection point on the enhanced form of the path.

2. The user interface apparatus according to claim 1, wherein the path positive response path portion is displayed in an ascending direction to the user and the negative response path is displayed in a descending direction to the user.

3. The user interface apparatus according to claim 1, wherein the negative response path includes a discontinuity, the discontinuity being a point in the negative response path that begins a non-continuous linear direction from the positive response path portion.

4. The user interface apparatus according to claim 1, wherein the processor is to control the display device to display the scale on the path with gradations increasing from the start point to the scale ends.

5. The user interface apparatus according to claim 1, wherein the path comprises a tick or check mark shape.

6. The user interface apparatus according to claim 1, wherein the processor is to control the display device to display a selection reinforcement image in dependence upon the degree of user traversal interaction in the positive or negative response direction along the path.

7. The user interface apparatus according to claim 1, wherein the processor is to control the display device to display only the image of the path in response to the initial user interaction.

8. The user interface apparatus according to claim 1, wherein the processor is to control the display device to display a question to prompt the user to interact with the user input device.

9. The user interface apparatus according to claim 1, wherein the processor is to control the display device to display a confirmation selection option, detect a user confirmation selection of the confirmation selection option from the user input device, and confirm the input scale data.

10. The user interface apparatus according to claim 1, wherein the processor is to generate a feedback to the user based on the determined scale selection response.

11. The user interface apparatus according to claim 10, wherein the processor is to control the display device in response to the user traversal interaction terminating at the selection point to display an indication of the scale selection response.

12. The user interface apparatus according to claim 1, wherein the user input device comprises a touch sensitive device.

13. The user interface apparatus according to claim 1, wherein the processor is to control the display device in response to a user handedness input on the user input device to switch the displayed image of the path between an image of a left handed path and an image of a right handed path for use by left handed users and right handed users respectively, the images of the left and right handed paths comprising mirror images.

14. A method of operating a user interface for inputting scale data, the method comprising:
controlling a display device to display an image of a path in a suppressed form for user interaction to follow to input a scale selection response from a scale between a first scale end indicative of a positive response and a second scale end indicative of a negative response and to display an indication of a start point on the enhanced path intermediate a first end of the path representing the first scale end and a second end of the path representing the second scale end, the path being asymmetric about the start point with a linear positive path portion for selection of a positive response extending from the start point and a non-linear negative path portion for selection of a negative response extending from the start point;
detecting an initial user interaction comprising a selection of the start point from the user input device;
controlling a display device to enhance the display of the image of the path from the suppressed form to an enhanced form based on the detection of the initial user interaction,
detecting a user traversal interaction from the user input device along the enhanced form of the path in a positive response direction alone the positive path portion or a negative response direction along the negative response path portion to terminate at a selection point on the path; and
determining a scale selection response and input scale data based on the selection point on the enhanced form of the path.

15. The method according to claim 14, wherein the positive response path portion is displayed in an ascending direction to the user and the negative response path portion is displayed in a descending direction to the user.

16. The method according to claim 14, wherein the negative response path includes a discontinuity, the discontinuity being a point in the negative response path that begins a non-continuous linear direction from the positive response path portion.

17. The method according to claim 14, wherein the scale is displayed on the path with gradations increasing from the start point to the scale ends.

18. The method according to claim 14, wherein the path comprises a tick or check mark shape.

19. The method according to claim 14, including displaying a selection reinforcement image in dependence upon the degree of user traversal interaction in the positive or negative response direction along the path.

20. The method according to claim 14, including displaying a question to prompt the user to interact with the user input device.

21. The method according to claim 14, including displaying a confirmation selection option, detecting a user confirmation selection of the confirmation selection option from the user input device, and confirming the input scale data.

22. The method according to claim 14, including generating a feedback to the user based on the determined scale selection response.

23. The method according to claim 22, wherein the feedback comprises displaying an indication of the scale selection response in response to the user traversal interaction terminating at the selection point.

24. The method according to claim 14, wherein the user input device comprises a touch sensitive device.

25. The method according to claim 14, including receiving a user handedness input to switch the displayed image of the path between an image of a left handed path and an image of a right handed path for use by left handed users and right handed users respectively, the images of the left and right handed paths comprising mirror images.

26. A system to provide a user interface to a client device having a display device and a user input device, the system comprising:
a hardware-based processor; and
a network interface adapted to be controlled by the processor to transmit computer program code to the client device to cause the client device to be configured to:
control the display device to display an image of a path in a suppressed form for user interaction to follow to input a scale selection response from a scale between a first scale end indicative of a positive response and a second scale end indicative of a negative response and to display an indication of a start point on the path intermediate a first end of the path representing the first scale end and a second end of the path representing the second scale end, the path being asymmetric about the start point with a linear positive path portion for selection of a positive response extending from the start point and a non-linear negative path portion for selection of a negative response extending from the start point,
detect an initial user interaction comprising a selection of the start point from the user input device,
enhance the display of the image of the path from the suppressed form to an enhanced form based on the detection of the initial user interaction,
detect a user traversal interaction from the user input device along the enhanced form of the path in a positive response direction along the positive path portion or a negative response direction along the negative response path portion to terminate at a selection point on the path; and
determine a scale selection response and input scale data based on the selection point on the enhanced form of the path.

27. A method of providing a user interface to a client device having a display device and a user input device, the method comprising
transmitting computer program code to the client device to cause the client device to be configured to:
control the display device to display an image of a path in a suppressed form for user interaction to follow to input a scale selection response from a scale between a first scale end indicative of a positive response and a second scale end indicative of a negative response and to display an indication of a start point on the enhanced path intermediate a first end of the path representing the first scale end and a second end of the path representing the second scale end, the path being asymmetric about the start point with a linear positive path portion for selection of a positive response extending from the start point and a non-linear negative path portion for selection of a negative response extending from the start point, detect an initial user interaction comprising a selection of the start point from the user input device, control a display device to enhance the display of the image of the path from the suppressed form to an enhanced form based on the detection of the initial user interaction, detect a user traversal interaction from the user input device along the enhanced form of the path in a positive response direction alone the positive path portion or a negative response direction along the negative response path portion to terminate at a selection point on the path, and determine a scale selection response and input scale data based on the selection point on the enhanced form of the path.

28. A non-transitory carrier medium storing computer implementable code for controlling a processor to perform operations comprising:

controlling the display device to display an image of a path in a suppressed form for user interaction to follow to input a scale selection response from a scale between a first scale end indicative of a positive response and a second scale end indicative of a negative response and to display an indication of a start point on the enhanced path intermediate a first end of the path representing the first scale end and a second end of the path representing the second scale end, the path being asymmetric about the start point with a linear positive path portion for selection of a positive response extending from the start point and a non-linear negative path portion for selection of a negative response extending from the start point, detecting an initial user interaction comprising a selection of the start point from the user input device, controlling a display device to enhance the display of the image of the path from the suppressed form to an enhanced form, detect a user traversal interaction from the user input device along the enhanced form of the path in a positive response direction alone the positive path portion or a negative response direction along the negative response path portion to terminate at a selection point on the path, and determine a scale selection response and input scale data based on the selection point on the enhanced form of the path.

29. A user interface apparatus to input scale data, the apparatus comprising:

a display device;

a user input device; and a hardware-based processor programmed to:

control the display device to display an image of a path in a suppressed form for user interaction to follow to input a scale selection response from a scale between a first scale end indicative of a positive response and a second scale end indicative of a negative response, and to display an indication of a start point on the path intermediate a first end of the path representing the first scale end and a second end of the path representing the second scale end the path being asymmetric about the start point, detect an initial user interaction comprising a selection of the start point from the user input device, enhance the display of the image of the path from the suppressed form to an enhanced form based on the detection of the initial user interaction, detect a user traversal interaction from the user input device along the enhanced form of the path in a positive or negative response direction to terminate at a selection point on the path, wherein a user traversal in the negative direction causes the display of the negative path to be modified and the display of the positive path to remain unmodified, and determine a scale selection response and input scale data based on the selection point on the enhanced form of the path.

30. A method of operating a user interface for inputting scale data, the method comprising:

controlling a display device to display an image of a path in a suppressed form for user interaction to follow to input a scale selection response from a scale between a first scale end indicative of a positive response and a second scale end indicative of a negative response and to display an indication of a start point on the enhanced path intermediate a first end of the path representing the first scale end and a second end of the path representing the second scale end, the path being asymmetric about the start point;

detecting an initial user interaction comprising a selection of the start point from the user input device;

controlling a display device to enhance the display of the image of the path from the suppressed form to an enhanced form based on the detection of the initial user interaction, detecting a user traversal interaction from the user input device along the enhanced form of the path in a positive or negative response direction to terminate at a selection point on the path, wherein a user traversal in the negative direction causes the display of the negative path to be modified and the display of the positive path to remain unmodified; and determining a scale selection response and input scale data based on the selection point on the enhanced form of the path.

31. A non-transitory carrier medium storing computer implementable code for controlling a processor to perform operations comprising:

controlling the display device to display an image of a path in a suppressed form for user interaction to follow to input a scale selection response from a scale between a first scale end indicative of a positive response and a second scale end indicative of a negative response and to display an indication of a start point on the enhanced path intermediate a first end of the path representing the first scale end and a second end of the path representing the second scale end, the path being asymmetric about the start point, detecting an initial user interaction comprising a selection of the start point from the user input device, controlling a display device to enhance the display of the image of the path from the suppressed form to an enhanced form, detect a user traversal interaction from the user input device along the enhanced form of the path in a positive or negative response direction to terminate at a selection point on the path, wherein a user traversal in the negative direction causes the display of the negative path to be modified and the display of the positive path to remain unmodified, and determine a scale selection response and input scale data based on the selection point on the enhanced form of the path.

* * * * *